J. S. THOMSON.
SLEIGH ATTACHMENT FOR MOTOR VEHICLES.
APPLICATION FILED OCT. 13, 1913.
1,105,939.
Patented Aug. 4, 1914.
4 SHEETS—SHEET 2.
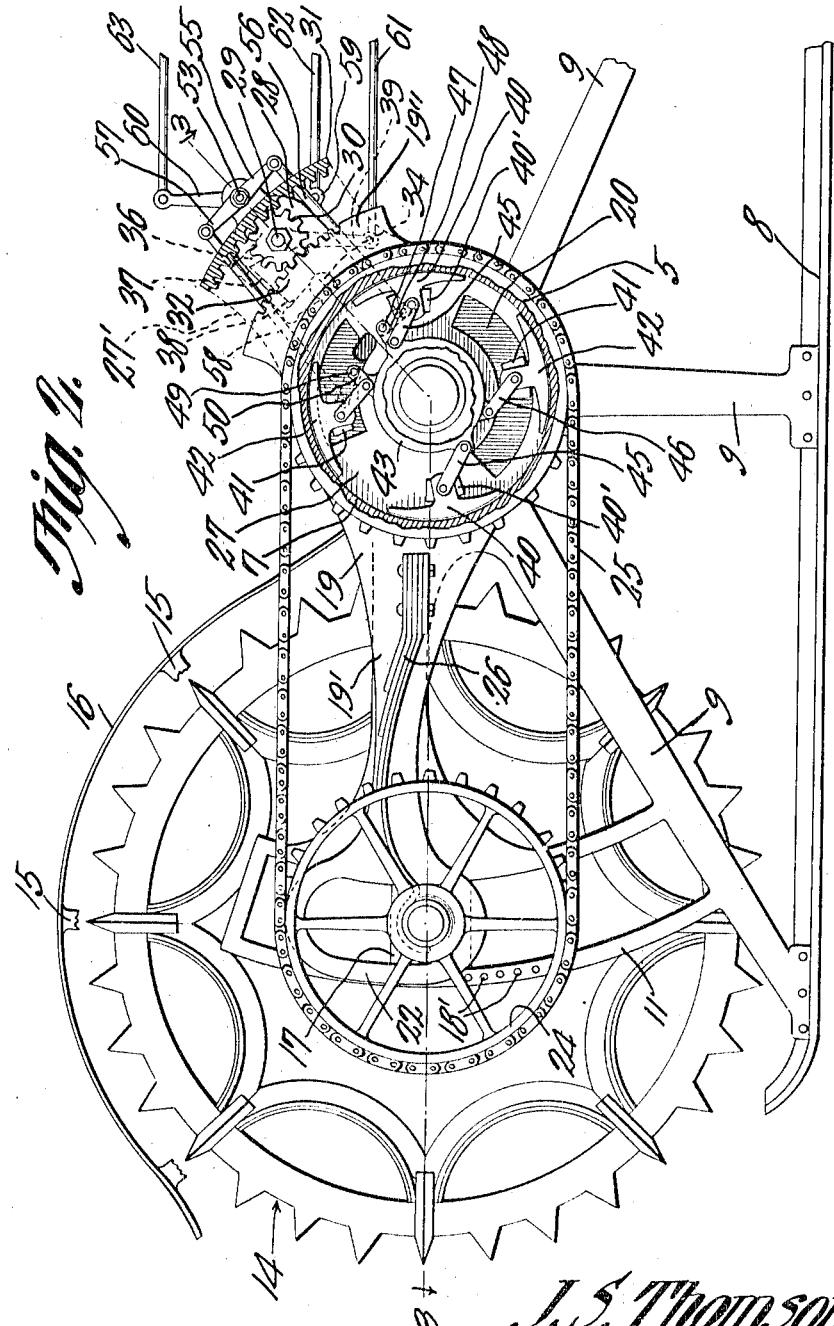

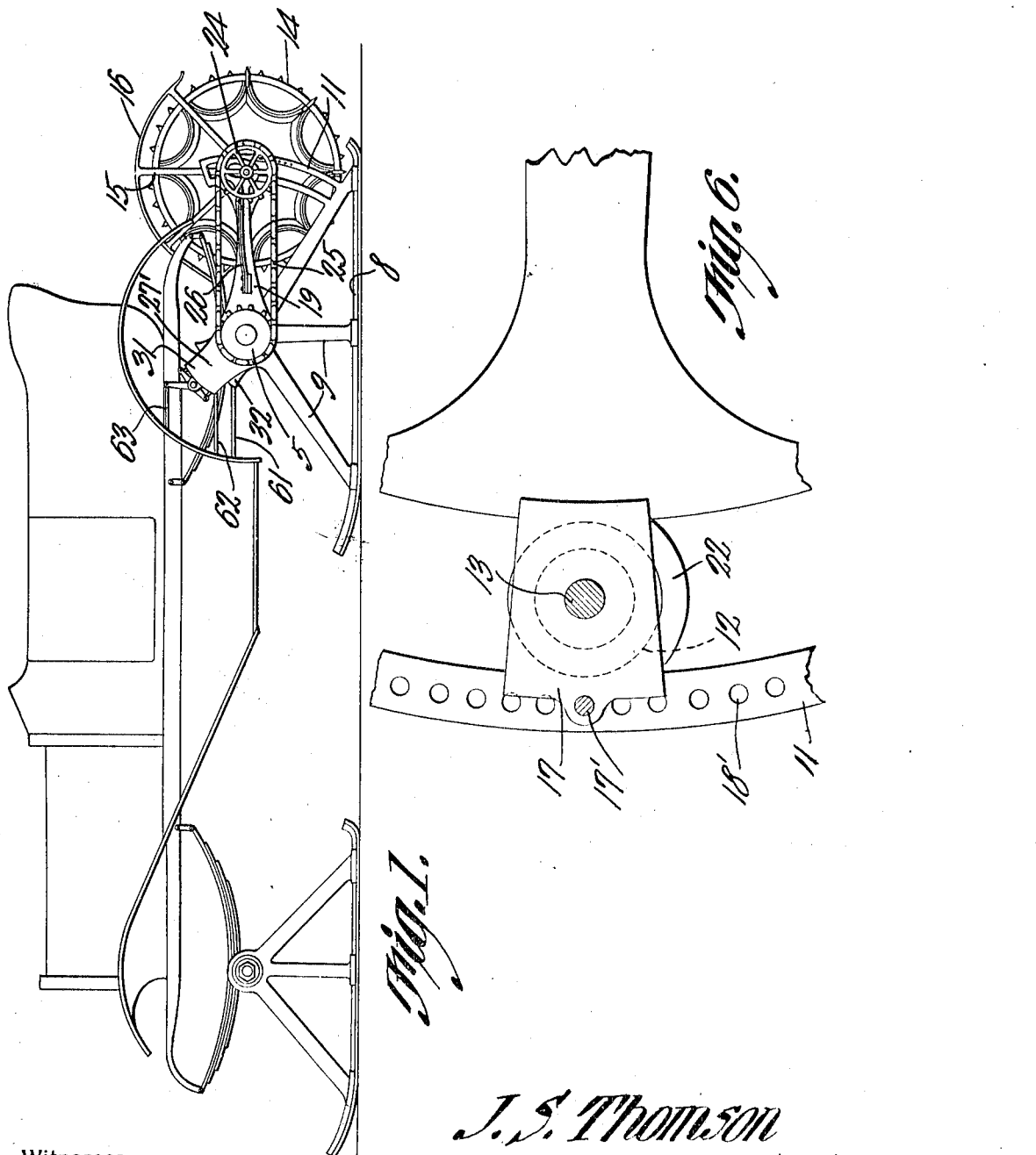

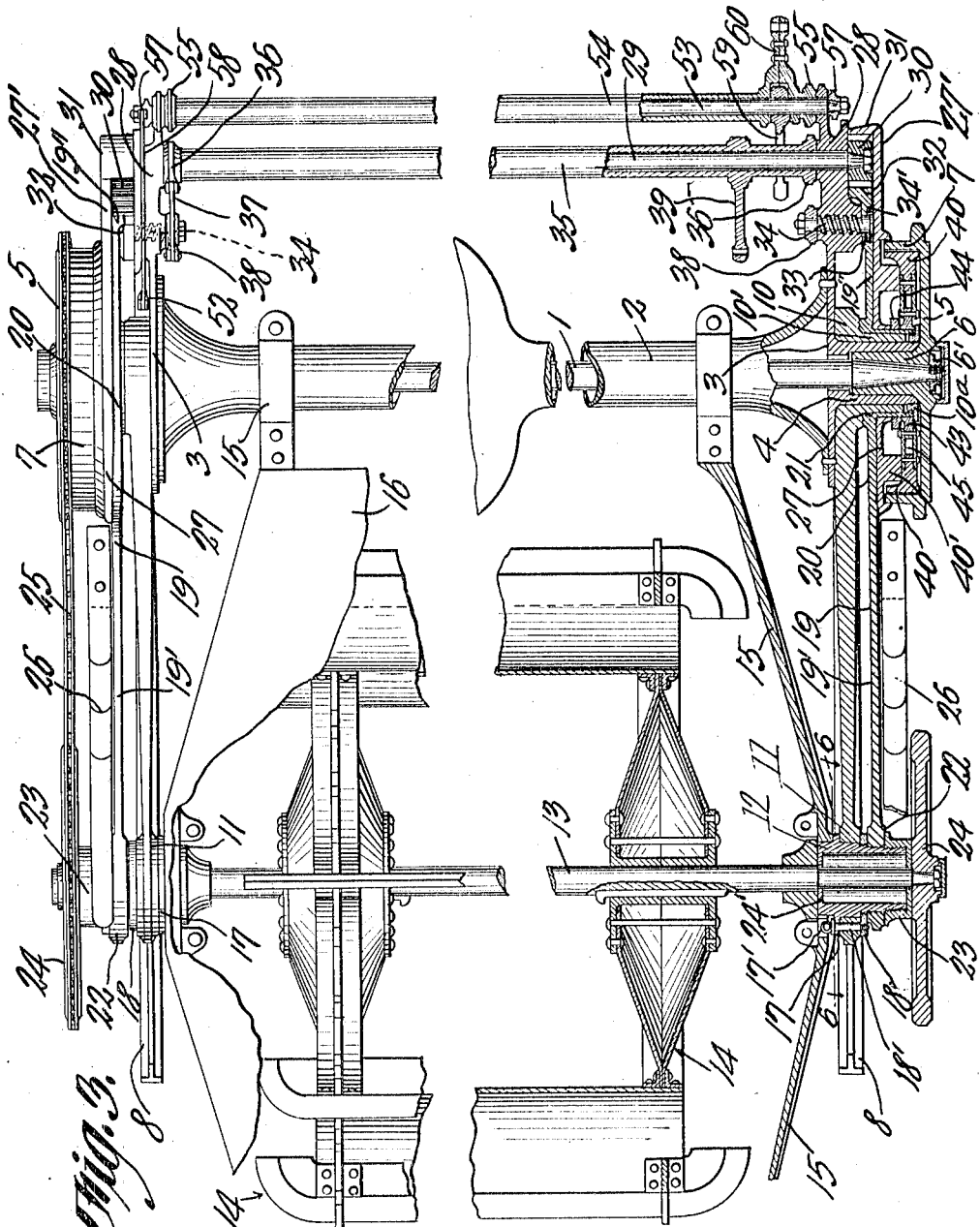

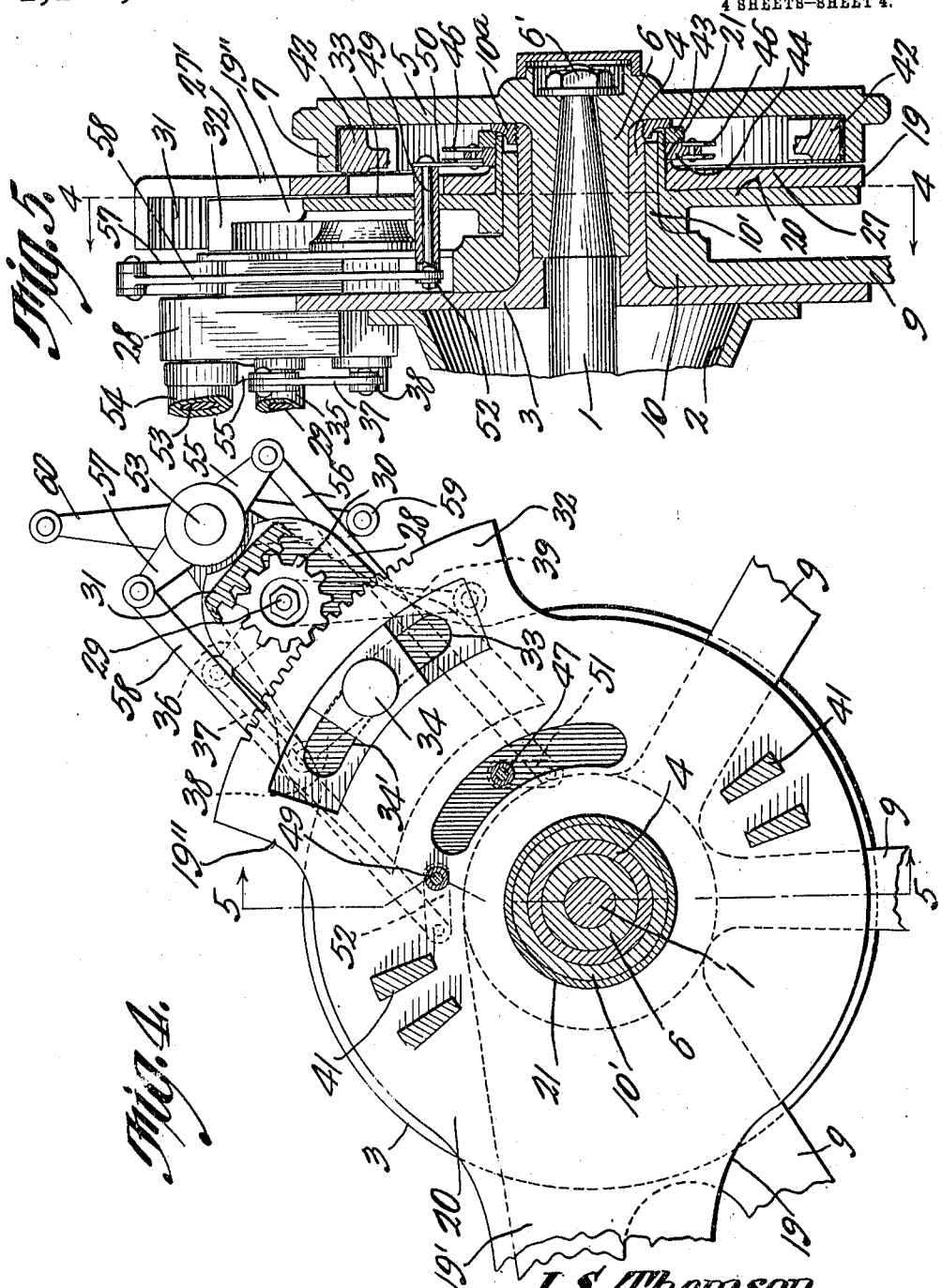

UNITED STATES PATENT OFFICE.

JAMES S. THOMSON, OF SEATTLE, WASHINGTON.

SLEIGH ATTACHMENT FOR MOTOR-VEHICLES.

1,105,939.  Specification of Letters Patent.  Patented Aug. 4, 1914.

Application filed October 13, 1913. Serial No. 794,977.

*To all whom it may concern:*

Be it known that I, JAMES S. THOMSON, a citizen of the United States, residing at Seattle, in the county of King and State of Washington, have invented a new and useful Sleigh Attachment for Motor-Vehicles, of which the following is a specification.

The present invention appertains to a sleigh attachment for automobiles or motor vehicles, and aims to provide a novel and improved appliance of that character.

One of the objects of the present invention is to provide a pair of runner attachments for the rear driving axle of a motor vehicle, in combination with a propelling mechanism attachable to the said driving axle to be actuated thereby, and to engage the ice and snow, or the underlying surface, for propelling or pushing the vehicle, it being understood that the said runner attachments are to be employed in connection with suitable front runner attachments for the usual steering knuckles, so that the usual driving and steering wheels are supplanted by suitable runners, to convert the machine into a sleigh.

Another object of the present invention is to provide a propelling mechanism which is movable to and from the surface traversed by the runners, in combination with means for mechanically raising and lowering the propelling mechanism, under the control of the operator, the said means also serving as a brake when so desired.

Another object of the present invention is to provide unique means for yieldingly depressing the propeller proper in order to permit it to yield when necessary.

A further object of the present invention is to provide in a device of the character indicated, a pair of attachments for the spindles of the rear driving axle including means for raising and lowering the propelling mechanism, in combination with means operatively connecting the two attachments in order that they will operate simultaneously under all conditions, to avoid a distortion of or undue strain upon the propelling mechanism.

A further object of the present invention is to provide novel means for locking the raising and lowering mechanisms against movement, in order that the propelling mechanism may be held in any suitable position desired.

A still further object of the present invention is to provide novel means for supporting and guiding the propeller shaft carrying the propeller, whereby when the propeller shaft is raised and lowered, the same will move parallel to itself, so as to avoid any twisting or binding tendencies.

It is also the object of the present invention to provide novel means for applying the component parts of the attachments to the spindles of the rear driving axle of the motor vehicle, and for mounting the several parts in position.

It is also within the scope of the present invention to improve generally the utility and construction of devices of the nature indicated, whereby the results desired may be most efficaciously carried out.

With the foregoing general objects outlined, and with further objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein similar reference numerals have been employed to denote corresponding parts, and wherein:—

Figure 1 is a side elevation of an arbitrary or conventional type of motor vehicle, illustrating the present apparatus applied thereto, the parts being more or less diagrammatically illustrated. Fig. 2 is a side elevation of the improved apparatus, parts being broken away, and the line of view being opposite to that of Fig. 1. Fig. 3 is a plan view of the apparatus as applied to the rear driving axle, parts being broken away, and parts being shown in section, the section being taken approximately on the line 3—3 of Fig. 2, and certain parts in advance of the axle being illustrated as lying in a horizontal plane for purpose of convenience and clearness. Fig. 4 is a sectional detail of the heart of one of the attachements for the ends of the driving axle, the section being taken on the line 4—4 of Fig. 5. Fig. 5 is a sectional view of the parts depicted in Fig. 4, the section being taken on the line 5—5 of Fig. 4. Fig. 6 is an enlarged fragmental detail taken on the section line 6—6 of Fig. 3.

At the outset, it might be stated that the present apparatus is designed for employment with suitable runners which are designed to supplant the ordinary wheels of a motor vehicle, the front pair of runners being attachable to the steering knuckles in order that the machine, when converted into a sleigh, can be guided or steered through the medium of the steering post, or the like. It is also to be understood, at the outset, that the present apparatus is not only designed as an attachment for motor vehicles, but may be embodied in an auto-sleigh construction with equal propriety and success. Thus, although the attachment is applied to the rear driving axle of a motor vehicle, this may be taken as typical, inasmuch as a shaft carried by a suitable sleigh structure, may be taken the same as the rear driving axle of a motor vehicle to all intents and purposes.

In the accompanying drawings, wherein the apparatus has been illustrated as applied to an arbitrary or conventional type of motor vehicle, the rear driving axle has been designated by the numeral 1, and the axle housing by the numeral 2.

The present apparatus embodies a pair of mechanisms attachable to the respective ends of the driving axle and its housing, and inasmuch as the two mechanisms are substantially duplicates or right and left handed, a description of one of the mechanisms will suffice for both. Each of the said mechanisms embodies a frame or plate 3, which is bolted or otherwise secured to the respective end of the axle housing 2 over the axle 1, this frame or plate 3 serving as a carrier for certain of the parts as will hereinafter more fully appear. The frame 3 is provided with an outstanding sleeve 4 surrounding, but spaced from, the respective spindle of the driving axle.

A sprocket wheel or driving member 5 is mounted securely upon the spindle of the driving axle, the sprocket wheel having an inwardly projecting bushing or boss 6 snugly embracing the axle spindle, and a nut or other securing member 6' being engaged on the end of the spindle to key or lock the sprocket wheel upon the spindle, in order that the sprocket wheel will rotate with the axle. The sprocket wheel is provided with an annular marginal inwardly projecting flange 7, for the purposes as will hereinafter appear.

The respective rear runner 8 is equipped with the converging standards 9, which merge into a hub 10 journaled upon the sleeve 4, and having an outwardly projecting sleeve or collar 10' journaled upon the sleeve 4, and terminating slightly short of the end of the sleeve 4. Thus, the rear runner 8 is adapted to oscillate, in traversing rough or uneven surfaces, the runner being independent of the driving axle. The runner is equipped at its rear end, with an arcuate slotted guide 11, which is curved about the axis of the driving axle 1, as a center. A journal box or boxing 12 is slidably mounted within the respective guide 11, and the propeller shaft 13 has its end portions journaled through the respective boxings 12 at the two sides. A suitable propelling or traction wheel 14 is keyed upon the propeller shaft 13 between the two boxings 12, the propeller 14 being of a suitable construction in view of the circumstances, and to best adapt it for the purposes intended. As illustrated, the propeller embodies a plurality of individual wheels, having peripheral spurs, and traction members connecting the respective wheels to facilitate the tractive efforts of the propeller. The particular construction of the propeller is of no great moment with respect to the means for actuating and controlling the same, so that the propeller need not be described or illustrated in detail. It is evident that the boxings 12 in being slidable in the guides 11 of the two rear runners, will permit the propeller shaft 13 to be moved upwardly and downwardly to bring the propeller into and out of coöperative position with respect to the underlying surface. It will also be evident that the propeller is located between the rear ends of the rear runners and directly in rear of the body of the motor vehicle, to best carry out the desired results.

If desired, a frame 15 may be connected loosely to the axle housing 2 and to the inner ends of the boxings 12, to support a hood or shield 16 for the propeller, in order that the hood or shield may be moved vertically with the propeller. The hood or shield will prevent snow, ice, etc., from being thrown upwardly, and will also prevent objects from dropping onto the propeller. Each boxing 12 is provided with an annular or circumferential flange 17 bearing against the inner side of the respective guide 11, or between the guide 11 and the hood-carrying frame 15. A collar or annulus 18 is threaded or otherwise engaged upon each boxing 12 so as to bear against the outer side or face of the guide 11, in order that the flanges 17 and collars 18 of the two boxings will constrain the boxings to slide truly along the guides 11, whereby the propeller shaft will be constrained to move parallel to itself, without having a tendency to tilt or bind.

Under certain circumstances, it may be desirable to lock the propeller shaft 13 to the guides 11, and to this end, each guide 11 may be provided with a series of apertures 18', in order that a locking pin or key 17' may be inserted through an aperture formed in the flange 17, through one of the apertures 18', to threadedly engage the collar or member 18. In this manner, the two boxings may be locked to the guides 11, to hold the propeller shaft stationary with respect to the rear runners, it being understood, that ordinarily, the pins or keys 17' would be removed, to permit the boxings to move freely within the guides 11.

A lever 19 is disposed directly outside of each runner and its guide 11, between the said guide and the driving axle 1, the lever 19 having a disk or plate 20 at its fulcrum point equipped with a central hub or bushing 21 journaled upon the collar 10' of the runner frame or attachment. The hub 21 projects outwardly from the disk 20, for the purposes which will hereinafter appear. The lever 19 is provided with a long arm 19' projecting to the guide 11, and which is equipped at its free end with a short arcuate slotted guide 22 complementing or coöperating with the guide 11 of the respective runner. The guides 22 and 11 are relatively short and long, and the respective boxing 12 is slidably disposed within both of the guides 11 and 22. The guide 22 engages the boxing 12 directly outside of the collar 18, a cap 23 being threaded or engaged over the outer end of the boxing 12 to bear against the guide 22, so as to maintain the said guide in position with respect to the boxing.

The respective end of the propeller shaft 13 projects through the cap 23, it being desirable to provide roller bearings 24' within the boxing 12 to journal the propeller shaft 13 for free movements within the boxing. A sprocket wheel 24 is keyed or secured upon the projecting end of the shaft 13, and a sprocket chain 25 is trained over the respective sprocket wheel 5 and 24 to operatively connect the propeller shaft with the driving axle. Thus, as the driving axle is rotated, the propeller shaft will be rotated likewise, it being observed that the propeller shaft in being movable in a curved path about the axis of the driving axle as a center, will permit the propeller shaft to be actuated at all positions thereof between the ends of the guides 11. The guides 22 are also curved similar to the curvature of the guides 11, as will be apparent.

In order to yieldingly depress the propeller, it being observed that the propeller shaft is carried by the levers 19 at the two sides, a leaf spring 26 is secured to each arm 19' of the two levers 19 and has its free end bearing upon the outer end of the boxing 12 or the boxing cap 23. Thus, although the boxings are free to slide within the guides 22, the boxings will be yieldingly depressed by the leaf springs 26 at the two sides. It might be pointed out, at this point, that the levers 19 in being swung, will raise and lower the propeller shaft as desired, and as will hereinafter more fully appear, so that when the arms 19' of the levers 19 are swung downwardly, to bring the propeller into engagement with the underlying surface, the springs 26 will maintain the propeller in proper engagement with the underlying surface, and will permit the propeller to yield when necessary without the propeller losing its tractive effort. It will also be apparent that the propeller is carried independent of the runners, in order that the runners may vibrate or oscillate without interfering with the propeller to any appreciable extent. For this reason, a clearance is provided between the lower ends of the guides 11 and the propeller shaft, when the propeller shaft is in its lowermost position.

Returning to the mechanism associated with the respective end of the driving axle and its housing, a disk 27 is journaled for rotation upon the hub 21 at the outer side of the disk 20, forming a part of the lever 19, the two disks 20 and 27 being operatively connected as will be hereinafter described. To this end, the frame or carrier 3 is provided with a forwardly inclined bracket or arm 28, and a cross shaft 29 has its end portions journaled through the brackets or arms 28 of the two frames or carriers 3. A pinion 30 is keyed or secured upon the respective end of the shaft 29 outside of the arm or bracket 28, and intermeshes with an external segment 32 carried by the other arm 19'' of the lever 19, the arm 19'' extending in a direction similar to the bracket or arm 28. The disk 27 is provided with an arm 27' projecting over the pinion 30 and having an internal segment 31 intermeshing with the pinion 30, in order that the disks 20 and 27 will be oscillated or actuated simultaneously. In view of the fact that the segment 31 is internal and that the segment 32 is external, the two segments intermeshing with the pinion will cause the disks 20 and 27 to be oscillated in opposite directions, the disk 27 moving at a slower velocity than the disk 20. It will be observed that the shaft 29 connecting the pinions 30 at the two sides, will cause the respective disks 20 and 27 at the two sides to be actuated simultaneously, in order that the levers 19 at the two sides will be swung in unison to avoid any untrue or improper movement of the propeller shaft, as would be objectionable.

In order to lock each of the levers 19 at any desired position, a clamping screw 34 is threaded through each of the brackets or arms 28, and has its outer end headed and engaging through an arcuate slot 33 formed in the disk 20 and curved about the axis of the driving axle as a center. A washer 34' is preferably engaged under the head of the screw 34 to work within an arcuate depression provided in the disk or plate 20, over the slot 33, in order that when the screw is rotated in the proper direction, the disk 20 will be tightly clamped against the bracket or arm 28 of the respective carrier 3. The screws 34 at the two sides are right and left handed, respectively, and are simultaneously actuated through the medium of a tubular shaft 35 journaled upon the cross shaft 29, arms 36 being secured to the ends of the shaft 35 and being connected by means of links 37 to arms 38 secured to the inner ends of the screws 34. Thus, when the shaft 35 is oscillated, the respective screws 34 will be properly swung or partially rotated to either bind or loosen the disks or plates 20. Thus, the levers, 19 at the two sides may be simultaneously locked or unlocked, the shaft 35 having a primary arm 39 for operatively connecting it with a hand lever or the like, positioned at the operator's seat.

Means are provided for operatively connecting the respective disks or plates 20 and 27 with the respective sprocket wheel 5 and to this end, frictional clutches are carried by the respective disks or plates for engagement with the inwardly projecting flange 7 of the sprocket wheel 5, which projects to the disk 20 and form a clutch box housing. The clutch carried by the disk or plate 27 embodies a pair of diametrically opposite friction shoes 40 slidably carried by diametrically opposite outstanding lugs or guides 40' of the disk 27. Similarly, the clutch carried by the disk or plate 20 embodies a pair of diametrically opposite friction shoes 42 slidably carried by outstanding lugs or guides 41 carried by the disk or plate 20 and working loosely through openings in the disk or plate 27. The respective pairs of friction shoes are disposed intermediate each other, or approximately at quadrature, with respect to one another, when the parts are at normal or neutral position, that is, when the propeller is elevated above the underlying surface, as seen in Figs. 1 and 2. The friction shoes 40 and 42 are disposed directly within the flange 7 of the sprocket wheel 5, and are designed to frictionally engage the said flange, as will hereinafter appear. The respective pairs of clutch shoes 40—42 are actuated through the medium of rings or annuli 43 and 44 journaled upon the outer end of the hub 21 of the plate or disk 20, the ring 43 being outermost, and the ring 44 being innermost, or adjoining the plate or disk 27. The shanks of the shoes 40 are connected by means of links 45 with the ring 43, while the shanks of the shoes 42 are connected by means of links 46 with the ring 44, the links being disposed obliquely, in order that the oscillatory movements of the respective rings will slide the shoes radially into and out of engagement with the sprocket wheel 5. Nuts 10ª are threaded onto the ends of the sleeves 4 to hold the several parts thereon. In order to actuate the respective rings or annuli 43—44, relatively small rock shafts 47 and 49 are journaled through the respective disks or plates 27 and 20, the respective plates 20 and 27 having arcuate openings through which the opposite shafts 47 and 49 pass, in order that the disks or plates 20 and 27 may oscillate without intereference. The outer end of the rock shaft 47 is connected by means of a crank arm 48 with the outer ring 43, while the outer end of the shaft 49 is connected by means of a crank arm 50 with the inner ring 44, the inner ends of the respective shafts 47 and 49 having the arms 51 and 52 respectively.

A cross shaft 53 has its ends journaled through the upper ends of the arms or brackets 28, above the shafts 29 and 35, and a tubular rock shaft 54 is journaled upon the shaft 53. An arm 55 is secured to each end of the tubular rock shaft 54, and is connected by means of a link 56, to the respective arm 51 of the shaft 47, while an arm 57 is secured to each protruding end of the rock shaft 53, and is connected by means of a link 58 with the respective arm 52. The said parts are so arranged as to operate properly, the links 56 and 58 being disposed below and above the respective end of the shaft 29, pinion 30, and screw 34. The rock shaft 53 is provided with an actuating arm 59 projecting through an opening between the sections of the shaft 54, while the sections of the shaft 54 are connected by a yoke forming an actuating arm 60. In practice, the arm 39 of the shaft 35 is connected, by means of a rod 61, to a suitable hand lever (not shown) disposed at the operator's seat, while the arms 59 and 60 are connected by means of the respective rods 62 and 63 with suitable foot levers at the operator's feet, in order that the respective shafts 35, 53 and 54 may be conveniently actuated when desired or necessary.

It will be observed that the forwardly inclined arms of the carriers 3, will support the shafts 29, 35, 53 and 54 properly between the chassis and the spring connecting the axle housings 2 with the chassis, in order that the said shafts will not interfere with the yielding motion of the rear driving axle and its housing, and in order that the said shafts will be most conveniently positioned for connection with the hand and foot levers at the operator's seat. Inasmuch as the particular manner of operatively connecting the said shafts with the hand and foot levers is of no particular moment, it is not necessary to illustrate or describe the same in detail, it being understood that the connections would vary with different types of motor vehicles. It may be most desirable, in some instances, to connect the rods 61, 62 and 63 with the hand and foot levers already existing in some motor vehicles, which are rendered useless by the application of the present device to the rear driving axle, it merely being necessary to employ the gear shift lever controlling the transmission, so that the driving axle may be rotated at various speed forward, and reverse, to correspondingly actuate the propeller.

In practice, the present apparatus is applicable to various types of motor vehicles, the runners supplanting the ordinary driving and steering wheels, to carry the body of the machine, it being understood that the front runners are of any ordinary style to fit the steering knuckles and other surrounding elements. The application of the present device to various types of motor vehicles will also necessitate obvious changes or alterations, which need not be discussed at length. Thus, in an auto-truck, wherein a jack shaft is employed, the same being connected to the respective driving wheels by sprocket chains, the rear axle being stationary, would necessitate the rotation of the sprocket wheels 5 of the present device, by sprocket chains, which will be clearly apparent. The present apparatus utilizes only the rear driving axle and its housing, or, in other words, the rear driving axle and its housing alone enter into direct combination with the present apparatus. The present apparatus is controlled entirely independent of the control of the motor vehicle.

In the operation of the device, it being understood that the locking pins 17' have been removed, to permit the propeller shaft boxings to slide freely within the guides 11, the rear driving axle 1 in being actuated, will transmit a similar rotary movement to the propeller 14 at all positions of the propeller shaft. Supposing the propeller to be raised as illustrated in Figs. 1 and 2, and supposing the screws 34 to have been tightened by the proper movement of the shaft 35, then the levers 19 will be locked in raised positions to hold the propeller in inoperative or raised position. Now, to bring the propeller into operation, the shaft 35 is rocked or oscillated in the proper direction, so as to release the screws 34 from the disks or plates 20, and consequently, the disks or plates 27 will also be free to move. Inasmuch as the plates or disks 27 are locked with the plates or disks 20, the plates or disks 20 being released when the screws 34 are loosened, will permit the levers 19 to drop under the weight of the propeller, to bring the propeller into engagement with the underlying surface. In this position, the propeller will merely engage the ice, snow or other underlying surface, by reason of its weight, so that the tractive effort would not be exceedingly great, but might be sufficient under certain circumstances.

To forcibly depress the propeller into engagement with the surface traversed, the clutch shoes 40 are thrown outwardly into frictional engagement with the flanges 7 of the sprocket wheels 5, this being accomplished by swinging the rock shaft 54 in the proper direction which will rock the shafts or spindles 47 so as to turn the rings 43, and consequently force the clutch shoes 40 outwardly. The shoes 40 in frictionally engaging the flanges 7 of the sprocket wheels 5, will cause the plates or disks 27 to rotate with the sprocket wheels, the sprocket wheels rotating in a clockwise direction as seen in Fig. 2. The plates 27 being swung or partially rotated with the sprocket wheels 5 will cause the pinions 30 to be rotated, so as to swing or oscillate the levers 19 in the opposite direction, this resulting in the depression of the rear arms 19' of the said levers, so as to forcibly depress the propeller shaft to carry out the result desired. By holding the clutch shoes 40 in frictional engagement with the sprocket wheels 5, a portion of the power of the motor will be transmitted to the levers 19, tending to raise the rear portion of the chassis, to throw the weight of the machine partially onto the propeller, which will greatly facilitate the tractive efforts of the propeller, there being a slight tendency to raise the rear runners, as will be apparent. The said function of forcibly depressing the propeller may be desirable under certain circumstances, especially when the propeller is unable, under other conditions, to properly grip the ice, snow or the like. Under ordinary conditions, however, when the propeller has been sufficiently depressed to bring the springs 26 into play for depressing the propeller against the surface traversed, the levers 19 are locked in position by rotating the screws 34 in the proper direction so as to bind the plates 20, as above stated. When the levers 19 have been thus locked, with the lower ends of the guides 22 thereof forced below the propeller shaft boxings, the springs 26 will yieldingly press the said boxings to hold the propeller in engagement with the underlying surface under the varying conditions. It will be noted that the guides 11 will permit the rear runners to oscillate independent of the propeller without interference.

It may be desired, under certain conditions, to lock the propeller shaft boxings to the runners 8, which may be accomplished by inserting the locking pins or keys 17' as above described. This will be found of advantage in running the sleigh backward over snow drifts or the like, inasmuch as the propeller is being carried by the rear ends of the runners 8, will serve to raise the rear ends of the runners over the snow drifts and the like, without the tendency of the runners to plow into the snow, as would ordinarily be the case. Inasmuch as a sleigh capable of both forward and rearward movements is almost indispensable in some regions, the above feature will be found of advantage, although it may be eliminated under favorable conditions.

When it is desired to raise the propeller to inoperative position, the screws 34 are again loosened, to free the levers 19, and the clutch shoes 42 are then brought into operation so as to frictionally engage the flanges 7 of the sprocket wheels 5. This is accomplished by properly swinging the rock shaft 53, which will swing the respective shafts or spindles 49, through the medium of the links 57, so as to properly oscillate or swing the rings 44, which will result in the outward thrust of the shoes 42. The shoes 42 frictionally engaging the sprocket wheels 5, will cause the plates 20 of the levers 19 to rotate with the sprocket wheels, so as to raise the arms 19' and to consequently raise the propeller shaft and propeller. After the propeller has been properly raised, the screws 34 may be thrown in to lock the levers 19 in raised positions.

An important or cardinal feature of the present invention resides in the fact that when all of the brake shoes are forced outwardly to frictionally engage the sprocket wheels 5, a braking action will be accomplished, tending to arrest the movement of the sprocket wheels and consequently tending to retard the movement of the propeller.

Importance is attached to the fact that the present apparatus permits the propeller to be raised and lowered by motive power, and under the perfect control of the operator, it merely being necessary for the operator to control the clutches, as above described. This feature is a valuable one, inasmuch as the operator is relieved of the burden of raising and lowering the propeller by hand, which would be burdensome, and objectionable.

The means for depressing the propeller forcibly, is also of advantage in connection with the springs 26 for yieldingly depressing the propeller with respect to the levers 19, for the reasons above discussed. The shaft 29 connecting the pinions 30, or connecting the two mechanisms at the opposite sides, is of advantage, inasmuch as the levers 19 at the two sides are constrained to operate in unison, should any of the clutches fail to operate at one side or the other.

The present attachment may be readily applied to and removed from a motor vehicle.

From the foregoing, taken in connection with the drawings, the advantages and capabilities of the present device will be obvious to those skilled in the art, it being noted that the objects aimed at have been carried out satisfactorily.

Having thus described the invention, what is claimed as new is:—

1. In a device of the character described, a driving medium, a vertically movable propeller-carrying means, and controllable means for operatively connecting the said means with the driving medium to move the said means vertically.

2. In a device of the character described, a driving medium, a vertically movable propeller-carrying means, and controllable means for operatively connecting the said means with the driving medium to move the said means either upwardly or downwardly.

3. In a device of the character described, a driving medium, a propeller-carrying lever, and controllable means for operatively connecting the lever and driving medium for actuating the lever.

4. In a device of the character described, a rotatory driving medium, a propeller-carrying lever, and independently controllable means for operatively connecting the said lever with the driving medium for swinging the lever in opposite directions.

5. In a device of the character described, a driving medium, a vertically movable propeller-carrying member, and a clutch for operatively connecting the said member and driving medium to move the said member vertically.

6. In a device of the character described, a driving medium, a vertically movable propeller-carrying means, a member operatively connected to the said propeller carrying means to move in the opposite direction, and independent clutch devices for operatively connecting the driving medium and said means or the said member.

7. In a device of the character described, a driving device, an oscillatory propeller-carrying device, and a clutch carried by one of said devices to engage the other for oscillating the propeller-carrying device.

8. In a device of the character described, a driving medium, a propeller-carrying lever, a member operatively connected with the lever to move in the opposite direction, and clutches carried by the lever and said member to engage the driving medium.

9. In a device of the character described, a driving medium, movable propeller-carrying means assembled therewith, a propeller carried by the said means and operatively connected to the said medium, and controllable means for operatively connecting the propeller-carrying means and the said driving medium.

10. In a device of the character described, a driving medium, a movable propeller-carrying means assembled therewith, a propeller carried by the said means, and operatively connected to the said driving medium, and independent controllable means for operatively connecting the propeller-carrying means and the driving medium to move the said means in either direction.

11. In a device of the character described, a rotatory driving device, an oscillatory propeller-carrying device assembled therewith, a clutch carried by one of the said devices and engageable with the other, and a propeller carried by the said propeller-carrying device and operatively connected to the said driving device.

12. In a device of the character described, a rotatory driving medium, an oscillatory propeller-carrying means assembled therewith, oscillatory means operatively connected to the propeller-carrying means to move in the opposite directions, a propeller carried by the propeller-carrying means and operatively connected to the said driving medium, and independent clutch devices for operatively connecting the driving medium with either the propeller-carrying means or the oscillatory means operatively connected to the propeller-carrying means.

13. In a device of the character described, a rotatory driving medium, a vertically movable propeller-carrying device assembled therewith, a movable device operatively connected to the propeller-carrying device to constrain the said devices to move in opposite directions, and clutch devices carried by both of the aforesaid devices and engageable with the driving medium.

14. In a device of the character described, a rotatory driving medium, an oscillatory propeller-carrying means assembled therewith, oscillatory means operatively connected to the propeller-carrying means to oscillate in directions opposite those of the propeller-carrying means, and clutch devices carried by both of the aforesaid means and engageable with the driving medium.

15. In a device of the character described, a rotatory driving medium, an oscillatory propeller-carrying lever assembled therewith, an oscillatory member, means connecting the lever and member for constraining them to oscillate in opposite directions, and independent means for operatively connecting the said lever and oscillatory member with the driving medium.

16. In a device of the character described, a rotatory driving medium, an oscillatory propeller-carrying lever assembled therewith, an oscillatory member, means connecting the lever and member for constraining them to oscillate in opposite directions, and clutches carried by the said lever and oscillatory member and engageable with the driving medium.

17. In a device of the character described, a rotatory driving medium, a pair of members operatively connected to oscillate in opposite directions, friction shoes carried by the respective members, and means for actuating the shoes, the shoes being engageable with the driving medium, and one of said members serving as a propeller-carrying element.

18. In a device of the character described, a carrier, a rotary driving medium assembled therewith, a pair of oscillatory members carried by the carrier, means carried by the carrier and operatively connecting the said oscillatory members to constrain them to move in opposite directions, and independent means for operatively connecting the oscillatory members with the driving medium, one of the said oscillatory members serving as a propeller carrier.

19. In a device of the character described, a carrier, a rotary driving medium assembled therewith, a propeller-carrying lever fulcrumed to the carrier, an oscillatory member carried by the carrier, means operatively connecting the lever and oscillatory member to constrain them to move in opposite directions, clutches carried by the lever and oscillatory member to engage the driving medium, and independent actuating means carried by the carrier operatively connected to the respective clutches.

20. In a device of the character described, a carrier, a rotatory driving medium assembled therewith, a pair of oscillatory plates carried by the carrier and having external and internal segments respectively, a pinion carried by the carrier and intermeshing with the said segments, one of the said plates having a propeller-carrying arm, and means for operatively connecting the respective plates with the driving medium.

21. In a device of the character described, a carrier, a rotatory driving medium assembled therewith, a pair of oscillatory plates carried by the carrier and having external and internal segments respectively, a pinion carried by the carrier and intermeshing with the said segments, one of the said plates having a propeller-carrying arm, and clutches carried by the said plates and engageable with the driving medium.

22. In a device of the character described, a carrier, a pair of oscillatory plates carried thereby and operatively connected to move in opposite directions, one of the plates having a propeller-carrying arm, a driving member having an annular flange adjacent the plates, and clutches carried by the plates and engageable with the said flange.

23. In a device of the character described, a carrier attachable to the housing of the rear driving axle of a motor vehicle and having a sleeve to fit around the spindle of the axle, a driving member attachable to the spindle of the axle, a propeller-carrying lever fulcrumed upon the said sleeve, and means for operatively connecting the lever and driving member.

24. In a device of the character described, a carrier attachable to the housing of the rear driving axle of a motor vehicle and having a sleeve to fit around the spindle of the axle, a driving member attachable to the spindle of the axle, a propeller-carrying lever fulcrumed upon the said sleeve, and clutch means movable with the lever and engageable with the driving member.

25. In a device of the character described, a carrier attachable to the axle housing of a motor vehicle driving axle and having a sleeve to surround the spindle of the axle, a pair of members journaled upon the sleeve and operatively connected to move in opposite directions, one of the said members having a propeller-carrying arm, a driving member attachable to the spindle of the axle, and means for operatively connecting the respective aforesaid members to the said driving member.

26. In a device of the character described, a carrier attachable to the axle housing of a motor vehicle driving axle and having a sleeve to surround the spindle of the axle, a pair of members journaled upon the sleeve and operatively connected to move in opposite directions, one of the said members having a propeller-carrying arm, a driving member attachable to the spindle of the axle, and clutch means carried by each of the first mentioned members and operable to engage the driving member.

27. In a device of the character described, a carrier attachable to the driving axle housing of a motor vehicle and having a sleeve to surround the spindle of the axle, plates journaled upon the sleeve and operatively connected to oscillate in opposite directions, one of the said plates having a propeller-carrying arm, a driving member attachable to the spindle of the axle, friction shoes carried by the said plates and coöperable with the driving member, and means carried by the carrier passing through the said plates and operatively connected with the shoes for actuating them.

28. In a device of the character described, a driving medium, an oscillatory propeller-carrying means, controllable means for operatively connecting the said means and driving medium, and means for locking the aforesaid means at various positions.

29. In a device of the character described, a carrier, a propeller-carrying lever fulcrumed to the carrier, a binding screw carried by the carrier and operatively connected to the lever to lock the same at any position, and means for actuating the said screw.

30. In a device of the character described, a carrier attachable to the driving axle housing of a motor vehicle and having an outstanding sleeve, a runner having a hub journaled upon the sleeve, and a propeller-carrying lever journaled upon the said sleeve, the runner and lever having coöperating portions for the support of the propeller.

31. In a device of the character described, a carrier, a runner and a lever journaled thereto, the runner having an arcuate guide, a propeller shaft bearing slidable in the guide and the lever having means engaging the said bearing for sliding the same in the guide.

32. In a device of the character described, a carrier having a sleeve, a runner and a lever journaled to the said sleeve, the runner having an arcuate propeller shaft guide, and the lever having means coöperating with the said guide to coöperate with the said shaft.

33. In a device of the character described, a carrier, a runner journaled thereto and having an arcuate guide, a lever journaled to the carrier, a propeller shaft boxing movable along the said guide, and the lever having means to engage the said boxing for sliding the same along the said guide.

34. In a device of the character described, a carrier, a runner and a lever journaled thereto, and having coöperating arcuate guides for a propeller shaft, and yieldable means carried by the lever to coöperate with the shaft for depressing the same.

35. In a device of the character described, a carrier, a runner and a lever journaled thereto, and having coöperating arcuate guides, a propeller shaft boxing slidably engaging both of the said guides, and yieldable means carried by the lever and engaging the boxing to depress the same.

36. In a device of the character described, a pair of carriers attachable to the ends of the driving axle housing of a motor vehicle, propeller shaft carrying levers fulcrumed to the carriers, means carried by each carrier for swinging the respective lever, and means extending between the said carriers and operatively connecting the said means for simultaneous movement.

37. In a device of the character described, a pair of carriers attachable to the ends of the driving axle housing of a motor vehicle, propeller shaft carrying levers fulcrumed to the carriers, driving members attachable to the ends of the driving axle, friction clutches movable with the levers to engage the said driving members, and means extending between the two carriers and operatively connecting the two levers.

38. In a device of the character described, a pair of carriers attachable to the ends of the driving axle housing of a motor vehicle, a runner and a lever journaled to each carrier, each of the runners having a guide, a boxing slidable along each guide, and a propeller shaft journaled through the boxings, the levers having means for engaging the boxings to slide the same.

39. In a device of the character described, a driving medium, a vertically movable propeller-carrying means, controllable means for operatively connecting the said means with the driving medium to move said means vertically, and locking means coöperable with the propeller-carrying means to hold it at any position to which it is moved.

40. In a device of the character described, a driving medium, a propeller-carrying lever, controllable means for operatively connecting the lever and driving medium for actuating the lever, and locking means coöperable with the said lever for holding the lever at any position to which it is swung.

41. In a device of the character described, a driving medium, a vertically movable propeller-carrying member, a clutch for operatively connecting the said member and driving medium to move the said member vertically, and locking means coöperable with the said member for holding it at any adjusted position.

In testimony that I claim the foregoing as my own, I have hereto affixed my signature in the presence of two witnesses.

JAMES S. THOMSON.

Witnesses:
FRED W. DAVIS,
C. M. TREVEAILLE.

Copies of this patent may be obtained for five cents each, by addressing the "Commissioner of Patents, Washington, D. C."